United States Patent [19]
Ryan

[11] Patent Number: 5,809,112
[45] Date of Patent: Sep. 15, 1998

[54] TELECOMMUNICATIONS RELAY SYSTEM

[75] Inventor: Kenneth Collingwood Ryan, Finksburg, Md.

[73] Assignee: Sprint Communications Co., L.P., K.C., Mo.

[21] Appl. No.: 674,618

[22] Filed: Jul. 3, 1996

Related U.S. Application Data

[63] Continuation of Ser. No. 324,845, Oct. 18, 1994, abandoned.

[51] Int. Cl.$^6$ ..................................................... H04M 11/00
[52] U.S. Cl. ........................ 379/52; 379/93.27; 379/93.18
[58] Field of Search .................................. 379/52, 93, 96, 379/97, 98, 93.01, 93.05, 93.14, 93.17, 93.18, 93.26, 93.27; 364/943.41

[56] References Cited

U.S. PATENT DOCUMENTS

| | | | |
|---|---|---|---|
| 4,651,300 | 3/1987 | Suzuki et al. | 364/943.41 |
| 4,866,759 | 9/1989 | Riskin | 379/97 |
| 5,112,148 | 5/1992 | Tanaka et al. | 364/943.41 |
| 5,163,081 | 11/1992 | Wycherley et al. | 379/52 |
| 5,283,833 | 2/1994 | Church et al. | 379/52 |
| 5,289,523 | 2/1994 | Vasile et al. | 379/52 |
| 5,353,337 | 10/1994 | Tsumura et al. | 379/93 |

FOREIGN PATENT DOCUMENTS

| | | | |
|---|---|---|---|
| 93019554 | 9/1993 | WIPO | 379/52 |

OTHER PUBLICATIONS

"Spelling Correction for the Telecommunications Network for the Deaf", by Karen Kukich, p. 82, Communications of the ACM, vol. 35 No. 5, May 1992.

"Mastering WordPerfect 5.1 & 5.2 for Windows" by Alan Simson, 1992.

The Article "An Experimental Study of Synthesized Speech Intelligibility Using Text Created by Telecommunication Device for the Deaf (TDD) Users" by Deborah G Schmitt et al. pp. 600.2.1–600.2.4, 1990.

*Primary Examiner*—Curtis A. Kuntz
*Assistant Examiner*—Stephen W. Palan
*Attorney, Agent, or Firm*—Harley R. Ball; Jed W. Caven

[57] ABSTRACT

A message initiated at a first terminal and transmitted over a first communications link to a relay interface may be relayed to a second terminal over a second communications link by converting the words in the message received at the relay interface into a format compatible for use by the second terminal. Then, the formatted words are individually analyzed so that corrections may be made prior to display at the second terminal. The formatted words may be corrected manually by a relay agent or automatically utilizing a computer program associated with a relay terminal at the relay interface. Then, the analyzed words are displayed at the second terminal. The relay interface may be used for unilateral and bilateral communication between a standard telephone set and a telecommunications device for the deaf (TDD).

8 Claims, 2 Drawing Sheets

TELECOMMUNICATIONS RELAY SYSTEM

RELATED APPLICATION

This application is a continuation of U.S. application Ser. No. 08/324,845, filed on Oct. 18, 1994, now abandoned.

The present invention is directed to providing telecommunications services for speech and hearing impaired persons and, more particularly, to a system and method for relaying messages between speech and/or hearing impaired persons and those who can hear and speak.

BACKGROUND OF THE INVENTION

A variety of telecommunications services are available over telecommunications links extending between a called party and a calling party. These telecommunications links include channels capable of transmitting voice and data messages. Some examples of telecommunications links or paths are standard telephone lines, fiber-optic cables, and radio waves. A standard telephone set (e.g., any push button or rotary dial phone) or another telecommunications device such as a computer with a modem may be utilized to access the desired telecommunications service.

Persons with hearing or speech impairments may use a telecommunications device for the deaf ("TDD") to communicate with one another over data channels, provided each party has a TDD. Generally, a TDD is a device that combines the functions of a telephone and a typewriter and provides a display. Thus, a TDD displays textual messages and also allows a user to type out his or her portion of the conversation. Other specialized equipment, such as a compatible computer (e.g., a personal computer with communications software and a modem), may also serve as a TDD.

There has long been a need for a telecommunications service that provides for communication between a party having specialized equipment (i.e., some form of a TDD) and a party using non-specialized telecommunications equipment. When communication with speech or hearing impaired persons is relatively infrequent from a particular location, acquiring specialized equipment may not be cost effective. For example, the expense of providing and maintaining a public pay telephone would increase dramatically if the pay phone were equipped with a TDD. Moreover, a party using a TDD may want to call a location that does not have specialized telecommunications equipment.

As a result of this need, telecommunications relay services are now available for communication between parties having specialized telephone equipment and parties without such equipment. Typically, the relay service will provide a specially-trained relay agent who can receive a message from either of the parties in a manner well-known in the art. Then, the relay agent transforms the received message into a format compatible for communication to the other party. After the formatted message is communicated to the other party, either of the parties may initiate another message. As an example, a first party using a standard telephone set may initiate a message intended for a second party over a voice channel to a relay agent who then uses a relay terminal to transform the voice message into a typewritten message that may be transmitted as data over a data channel to the second party's TDD. With existing systems, typewritten messages are transmitted to the end user's TDD character by character, and each character appears at the TDD display one at a time shortly after being typed at the relay terminal. To relay messages from a TDD to a standard telephone set, the agent simply reads the typed message (received and displayed at the relay terminal) from the TDD out loud over a voice channel connecting the agent to the party using a standard telephone set.

A common problem with the existing telecommunications relay services is that the relay agent's typographical errors appear at the TDD display. The presence of misspelled words or other typographical errors in a message tend to distract the reader and may even confuse or alter the intended meaning of the message. Ironically, the reader may become even more confused if the relay agent attempts to correct the typing error because an error message followed by the corrected text usually appear next to the typing error at the TDD display. Thus, the continuity of the message to the end user is significantly disrupted since the TDD display, which presents a limited number of characters at one time (e.g., twenty characters), may quickly become occupied with misspellings, error messages, and corrected spellings. Therefore, it can become extremely difficult for the end user to readily understand the intended message when the message received at the TDD is replete with mistakes and error messages, especially if part of the message is unnecessarily forced off of the TDD display.

Although forms of error correction for digital data transmission are known, such as checksums, as yet there are no systems providing error correction of ASCII data during relay and transmission in a TDD system.

There are also data processing systems which check the spelling of words by comparing the words in a document to a list of structurally similar words to find a match. These systems typically require interaction of the user to select the proper spelling and are not suited to the requirements of relay transmission. More advanced word processing error correction systems have yet to be applied to relay transmission in a TDD system.

SUMMARY OF THE INVENTION

The present invention overcomes the problems associated with existing telecommunications relay services by providing a system and method for correcting mistakes before the message is displayed at the end user's TDD. Moreover, relaying the message to the end user word by word rather than character by character affords the relay agent greater control over the overall quality of the service (e.g., manual error correction) . In a further feature of the present invention, a computer program analyzes each word in the message prior to its display at the end user's TDD to determine whether the typed word requires correction based on a comparison of the typed word with the contents of a reference database. If so, the system may automatically replace the typed word with the corresponding correct spelling from the database. The computer program may analyze the words prior to transmission to the TDD (if the program resides at the relay terminal) or following transmission (if the program resides at the TDD). In either case, the typed/corrected word is then displayed at the TDD so it can be read by a speech or hearing impaired person. In this way, improved spelling accuracy will increase customer satisfaction with the relay service despite the slight delay that is likely to occur while the text is being analyzed in accordance with the present invention.

Accordingly, it is an important object of the present invention to provide a system and method for making corrections to words in a message before the words are displayed at the TDD.

A further object of the present invention is to provide a system and method for relaying typewritten messages word by word from a relay terminal to the TDD user rather than character by character so that the quality of the relay service may be improved.

Yet another object of the present invention is to provide a system and method for analyzing the words in a typewritten message to determine whether a particular typed word is a common misspelling. A related object of this invention is to identify misspelled words and replace them with correct spellings prior to display at the TDD. A further related object of this invention is to automatically correct misspelled words before displaying the word to the end user.

To accomplish these and other related objects of the invention, a system is provided for relaying messages from a first telecommunications device to a second telecommunications device wherein the system comprises a relay terminal capable of storing received messages and sending these messages over a communications link to the second device and further comprises analysis means for correcting at least one word in a message prior to displaying the message at the second telecommunications device. Further, a method is provided for relaying a telecommunications message initiated at a first terminal to a second terminal via a relay interface wherein the method involves formatting a word from a received message for display at the relay terminal and analyzing the formatted word for the purpose of making corrections thereto before the analyzed word is displayed at the second terminal. The formatted word is compatibly transmitted from the relay terminal to the second terminal for display. The entire message may be relayed by repeating these steps for each word in the received message.

BRIEF DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE DRAWINGS

Figure 1:
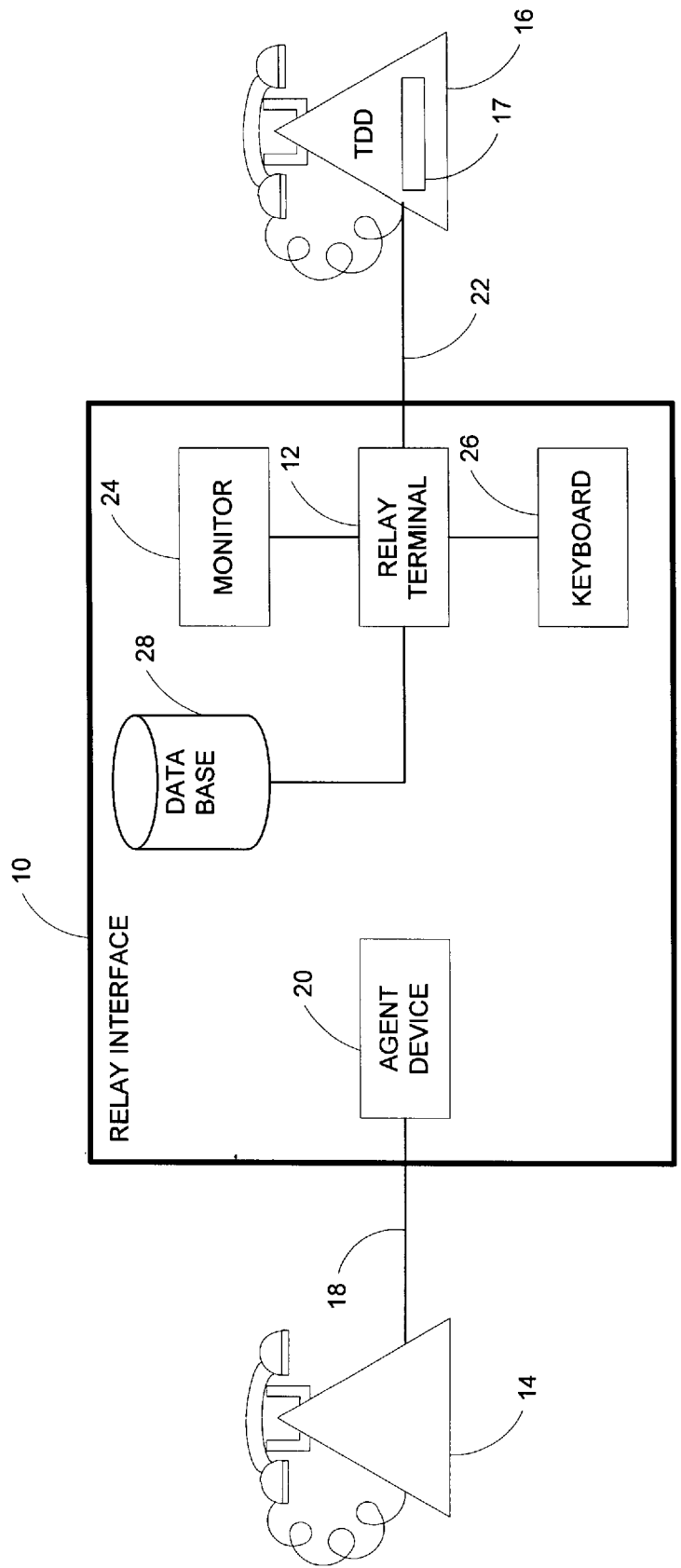
FIG. 1 is a block diagram of the telecommunications relay system of the present invention.

Referring now to the drawings in greater detail and initially to FIG. 1, the telecommunications relay interface system of the present invention is designated generally by reference numeral 10. Interface 10 includes an operator/relay terminal 12 and couples a standard telephone set 14 with a TDD 16 having an associated display 17. A first telecommunications link 18 connects phone 14 with interface 10 through an agent telephone device 20, and a second telecommunications link 22 connects TDD 16 with interface 10 through terminal 12.

Although link 18 connects phone 14 with interface 10 as shown in FIG. 1, communication links similar to link 18 may be used to connect any number of other telephones or TDDs to interface 10 as is well-known in the art. Likewise, communication links similar to link 22 may be used to connect other TDDs or telephones to interface 10. Further, interface 10 may comprise a plurality of terminals 12 and a plurality of agent devices 20 for simultaneously relaying individual messages within multiple conversations. Thus, the interface 10 shown in FIG. 1 merely presents one example of a basic interface for relaying messages back and forth between a pair of customers engaged in a single conversation.

For the purposes of the present invention, the term "message" refers generally to a communication from one entity to another entity regardless of the form of the message (e.g., voice, data, images). Typically, a conversation between two individuals will involve the communication of several messages back and forth. A message may contain one or more words whether the message is an audio message or a data message. As used herein with respect to textual or data messages, a "word" is a string of one or more alphanumeric or symbol characters (i.e., a non-null string of characters), such as those characters available on a typewriter or computer keyboard, delimited by a preselected character such as a blank space.

In a preferred embodiment, terminal 12 is adapted to communicate with TDD 16 over a data channel of link 22, and agent phone 20 is adapted to communicate with phone 14 over a voice channel of link 18. Terminal 12 may include or be coupled with a monitor 24 and a keyboard or other data input device 26 to facilitate the conversion of a received message from one transmission medium to another.

Although an operator or relay agent is typically responsible for manipulating terminal 12 to relay messages between phone 14 and TDD 16, it is contemplated by the present invention that the relay function may be automated so that the presence of a human operator would not be required. For example, speech recognition software could be employed at device 20 to interpret a voice message from a caller at phone 14 and convert the message from a voice format to a data format while providing an error correction feature for words that are not recognized by the software. This feature might be used when the speech recognition software attempts a phonetic spelling of the unrecognized word or if the software were to prompt the caller to spell an unrecognized word by speaking each letter of the word into their telephone set. If the software is specifically designed to recognize the voice of particular relay agents, the accuracy of the relay service may be improved by having one of these agents listen to the caller and repeat the voice message into a terminal adapted to convert the agent's voice message into a data message.

As a further example, it may be desirable to provide a device 20 that recognizes dual tone multifrequency (DTMF) signals from a telephone 14 and converts these signals into a data format compatible for relaying messages to TDD 16 via relay terminal 12. Accordingly, a caller could manipulate the keys on phone 14 to spell individual words in accordance with the letters assigned to each of the numbered keys on a standard telephone keypad. Then, an error correction or spell-checking routine could be provided to correct a word misspelled by the caller prior to displaying the word at TDD display 17. Of course, a single composite terminal could be utilized to perform the functions of both device 20 and terminal 12 whether the automated system recognizes DTMF or voice signals. For either embodiment operating without a relay agent, a data message initiated at a TDD may be converted to a voice message by a voice generator at the relay interface.

Phone 14 is preferably a standard push button or rotary dial telephone adapted for communication over a telecommunications link to effect voice communication with another telephone or similar telephone equipment. However, application of the present invention is not restricted to standard telephones. The preferred embodiment of the present invention may be readily adapted so that a party using a cellular phone, a mobile phone, a telefax machine, or some other telecommunications equipment may communicate with TDD 16 via relay interface 10. TDD 16 may be any telecommunications device having a display 17 for displaying received messages and having means for sending messages over a telecommunications link. Display 17 may be a multi-segment LED (light emitting diode) or LCD (liquid crystal display), a gas discharge or plasma display, or any other type of display compatible with a particular TDD. A seven segment LED display is preferred. A personal computer coupled with a modem is a form of TDD 16 that uses the computer monitor as a display 17. Also, an auxiliary printer could serve as display 17.

In particular, terminal 12 of the present invention is adapted to monitor the accuracy and quality of messages that are relayed from phone 14 to TDD 16. The preferred embodiment of the present invention includes a computer program that is associated with terminal 12 and a database 28 containing a listing of commonly misspelled words along with their common misspellings. Of course, the disclosed system may be required to interact with other software associated with terminal 12 such as an operating system. It is well-known in the art that the contents of the database 28 may be as limited or as comprehensive as desired. Thus, in the preferred embodiment, the accuracy and effectiveness of the entire system is dependent upon the careful selection of commonly misspelled words and their exact misspellings.

Figure 2:
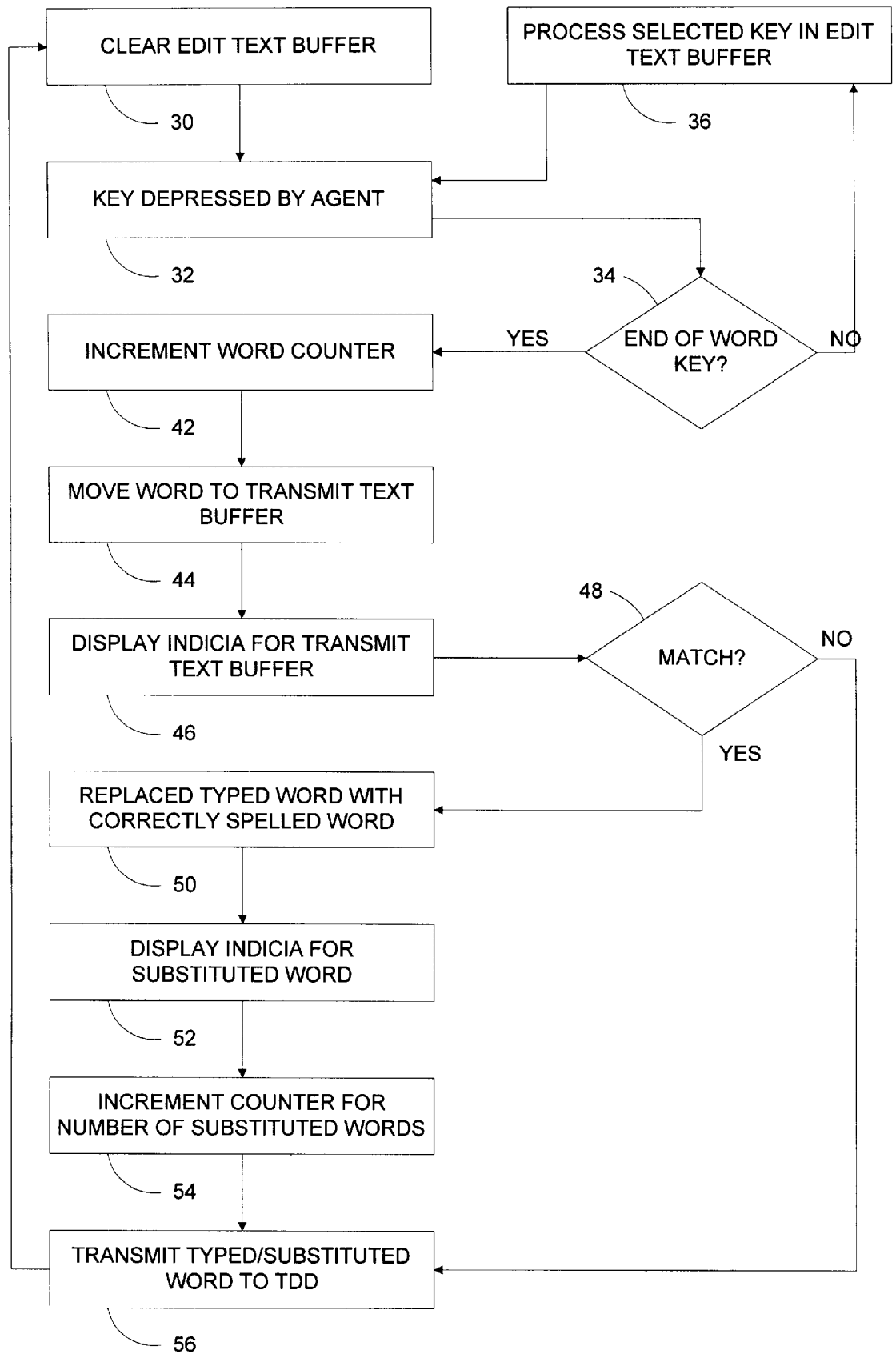
FIG. 2 is a flow chart representative of a computer program used to analyze messages communicated in conjunction with the telecommunications relay system of the present invention.

The computer program of the present invention analyzes the words contained in a typed message to identify mistakes such as misspelled words in accordance with the flow chart of FIG. 2. At step 30, the program clears the edit text buffer in preparation for acceptance of the next word in a message. Then, the relay agent commences conversion of the message to an appropriate data format by depressing a key at step 32 which corresponds to a character representing a portion of the voice message originating from a caller at phone 14. Step 32 contemplates typing any alphanumeric or symbol character associated with the voice message or actuating a key that has a designated purpose (e.g., backspace).

While a word is still in the edit text buffer, typographical and spelling errors in the word may be manually corrected. To do so, the relay agent may actuate keys on the terminal keyboard 26 such as the delete, insert, backspace, or arrow keys to manually edit the typed characters. Moreover, the program may be designed to count the number of words manually edited by the agent. Since manual correction occurs prior to data transmission, a TDD user will not be aware of the underlying errors that are manually corrected.

Step 34 determines whether the agent has depressed the preselected "end of word" or delimiter key (e.g., the spacebar). If the program determines at step 34 that the delimiter key was not depressed, the program remains in the edit text buffer and operates at step 36 in accordance with the key that was depressed at step 32. For example, if the backspace key was depressed, the program will move the cursor back one space and erase the character (or punctuation mark) that occupied that space. After the program responds to the depressed key, it returns to step 32 in preparation for the next key depression. If the system determines at step 34 that the delimiter key was depressed, the system proceeds to step 42.

In another embodiment, if the delimiter key has been depressed, then the program determines whether the contents of the edit text buffer are either "GA" or "SK", which are preselected code words. "GA" (or "go ahead") informs the other party that the outgoing message is complete and that the party is ready to receive an incoming message. By contrast, "SK" indicates to the other party that the conversation is over. If the contents of the edit text buffer were either "GA" or "SK", then the program will move the contents of the edit text buffer to the transmit text buffer and transmit the contents to TDD 16 for display. At this point, the parties may terminate the connection, or they may continue to send messages back and forth by initiating a new message at step 30. If the system determines that the contents of the edit text buffer are not "GA" or "SK", then the system proceeds to step 42.

In either embodiment, when the system advances to step 42, a word counter is incremented. Next, at step 44, the contents of the edit text buffer are moved to the transmit text buffer, and step 46 provides the agent with indicia of text status (i.e., that the text is in a transmit text buffer) at terminal 12. In the preferred embodiment, the particular color of the text displayed at the relay terminal monitor 24 indicates whether the text is presently in the edit text buffer or the transmit text buffer.

Once the delimiter key is actuated, the string of typed characters can no longer be edited manually by the agent. However, the program analyzes this character string as a single "word" by automatically determining at step 48 whether that particular string of characters (excluding any punctuation or spaces at the end of the string) is identical to one of the common misspellings stored in a file in database 28. If so, step 50 replaces the typed (misspelled) word with the corresponding correct spelling from the database 28 and provides indicia of the status of the word (i.e., that a correct spelling was automatically substituted for the typed word) at step 52. The preferred embodiment indicates whether the word is a substituted word or a typed word by the particular color of the text displayed at the relay terminal monitor 24. Preferably, step 54 increments a counter for the number of words automatically corrected. Next, the program advances to step 56 for transmission of the contents of the transmit text buffer to TDD 16. Then, the program returns Lo step 30 to clear the edit text buffer for further character input.

If the delimiter key was depressed and step 48 determines that the previously typed word does not identically match any of the common misspellings in the database file, the program will advance directly to step 56 and transmit the typed word to TDD 16. Then, the program returns to step 30 to clear the edit text buffer for further character input.

As shown in FIG. 2, a misspelled word will not be automatically corrected unless that particular misspelling has been entered into the database file. Accordingly, the file may contain as many common misspellings as desired. For example, one embodiment of the present invention may limit the entries in the database file to words that are of a particular length (e.g., words containing ten or fewer characters) . Similarly, it may be advisable to omit certain common misspellings from the database 28 when it is difficult to determine the intended word. For instance, "teh" may be a common misspelling of either "the" or "ten". Therefore, it may be desirable to leave "teh" out of the database file and rely on manual correction rather than risk automatic substitution of the wrong correct spelling.

Of course, the steps set forth in the flow chart of FIG. 2 are not carried out until after a customer has been connected to interface 10 over link 18 or link 22. For example, a caller using phone 14 may dial a telephone number corresponding to phone 20 and be connected to interface 10 over link 18 with a relay agent. Then, the caller may identify the TDD number of a particular TDD destination 16 so that terminal 12 may establish a connection with TDD 16 over link 22. Alternatively, a speech or hearing impaired person using TDD 16 could initiate the call by establishing communication with terminal 12 over link 22 and identifying the desired phone destination 14 to the relay agent.

Once phone 14 is coupled with TDD 16 via interface 10, either party may send a message to the other party, but the present invention is primarily directed to the relaying of messages from phone 14 to TDD 16 through interface 10. When a party using phone 14 transmits a voice message over link 18 to interface 10, the message is received by a relay agent utilizing relay telephone device 20. The relay agent is specially-trained to convert incoming messages into a format compatible for transmission over an appropriate telecommunications medium depending on the destination (e.g., converting voice messages into data messages for display at a TDD).

In the preferred embodiment, a textual message appears at monitor 24 upon actuation by the relay agent of the corresponding keys on keyboard 26. As a particular word is being typed, the agent may edit the word manually by manipulating keys on keyboard 26 (e.g., the backspace, insert, delete or arrow keys). The present invention assigns a particular key, such as the spacebar, as a word delimiter, but any other key could be designated to signal the end of a word. When the predetermined delimiter key is depressed, the program will analyze the character string in accordance with FIG. 2 so that corrections will be made to the message automatically prior to its transmission from terminal 12 to TDD 16. In an alternative embodiment, the program may provide a means for bypassing automatic word substitution to avoid situations where a particular acronym, abbreviation, or other nonstandard word is deliberately used.

A most preferred embodiment of the present invention comprises a relay terminal 12 having a monitor 24 for character display and a keyboard 26 for character input. In this embodiment, a computer program analyzes the words typed at keyboard 26 and displayed at monitor 24. Thus, the most preferred relay system includes analysis structure for both manual analysis (e.g., keyboard and monitor) and automatic analysis (e.g., computer program and computer hardware).

Also, in the most preferred embodiment of the computer program, the spacebar is designated as the delimiter key, which signals the end of a word. Prior to depression of the delimiter key, the string of characters in the edit text buffer preferably appear as red text. However, the text color changes to dark blue upon depression of the designated delimiter key because the string of characters is moved to the transmit text buffer. If a word in the transmit text buffer is replaced with a commonly misspelled word in accordance with the present invention, the substituted word is displayed as magenta text. In this way, the status of the word is readily apparent to the relay agent. Further, the most preferred form of the present invention includes a word counter feature that counts the number of words typed, the number of words corrected manually, and the number of words corrected automatically (i.e., substituted words).

However, other embodiments of the present invention would be readily apparent to those of ordinary skill in the art. For example, a mouse or trackball may be used in place of the terminal keyboard. Similarly, a touch-screen monitor may be employed rather than a standard terminal monitor. Potential enhancements to the software, such as pull-down menus and special function keys, are virtually unlimited. Also, there is a vast number of color combinations available to indicate the status of a word displayed on the monitor. Therefore, many alternative embodiments are contemplated within the scope of the claims.

Although the telecommunications relay service must be capable of transmitting data from terminal 12 to TDD 16, any conventional means of data transmission will suffice. In the preferred embodiment, the text displayed at monitor 24 is transformed into an appropriate form for serial transmission over a communications line such as link 22. The present invention employs "word serial" transmission rather than the prior art method of "character serial" transmission. The serial bit stream may utilize a Baudot code, ASCII (American Standard Code for Information Interchange, EBCDIC (Extended Binary-Coded Decimal Interchange Code), or some other transfer syntax. Preferably, frequency-shift keying (FSK) is used for communicating the data from terminal 12 to TDD 16. A system in accordance with the preferred embodiment of the present invention will typically transmit data at a maximum rate of forty-five bits per second. The data transmission could employ start and stop bits as well as checksums to aid in transmission and processing.

A further application of the present invention involves a system for analyzing messages typed at a TDD 16 for spelling or typing errors before displaying these messages on monitor 24. Such a system would operate in much the same manner as the preferred embodiment except that the corrections improve communication between TDD 16 and phone 14. Therefore, the relay agent will see fewer typing errors at monitor 24. In addition to manual correction at TDD 16, a computer program in accordance with this further application may analyze the words of a message for automatic correction at either TDD 16 or terminal 12.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A telecommunications relay system for use by a relay agent who receives a spoken message from a first telecommunications device and uses the relay system to transmit a text version of the message to a second telecommunications device, the relay system comprising:
   a relay terminal that is operational to allow the relay agent to receive the spoken message and enter the message into the relay terminal in a text format;
   analysis logic in the relay terminal that is operational to automatically spell check and automatically correct the text entered into the relay terminal by the relay agent; and
   a transmitter that is coupled to the relay terminal and that is operational to transmit the spell checked and corrected text version of the message to the second telecommunications device on a word-by-word basis.

2. The system of claim 1 wherein the second telecommunications device is a telephone terminal for the deaf.

3. The system of claim 1 wherein the relay terminal is operational to indicate whether the text has been corrected.

4. The system of claim 1 further comprising communications links from the first telecommunications device to the relay system and from the relay system to the second telecommunications device, wherein the communications links are operational to transfer the messages.

5. A telecommunications relay system for receiving a spoken message from a first telecommunications device and for transmitting a text version of the spoken message to a second telecommunications device, the relay system comprising:

a relay terminal means for receiving the spoken message from the first telecommunications device and for converting the spoken message into a text format;

analysis logic in the relay terminal means that is operational to automatically spell check and automatically correct the text entered into the relay terminal means; and a transmitter that is coupled to the relay terminal means and that is operational to transmit the spell checked and corrected text version of the message to the second telecommunications device on a word-by-word basis.

6. The system of claim 5 wherein the second telecommunications device is a telephone terminal for the deaf.

7. A telecommunications relay method for use where a relay agent receives a spoken message from a first telecommunications device and uses the relay system to transmit a text version of the spoken message to a second telecommunications device, the relay method comprising:

receiving the spoken message from the first telecommunications device;

entering the message into a relay terminal in a text format;

automatically spell checking the text entered into the relay terminal;

automatically correcting the text based on the spell check; and transmitting the spell checked and corrected text version of the message to the second telecommunications device on a word-by-word basis.

8. The method of claim 7 wherein the second telecommunications device is a telephone terminal for the deaf.

* * * * *